May 24, 1955  E. E. BLAUROCK  2,709,096
RESILIENT BUSHING AND METHOD OF MAKING SAME
Filed Nov. 29, 1949

INVENTOR.
Edward E. Blaurock
BY
William R. Epes
ATTORNEY

United States Patent Office 2,709,096
Patented May 24, 1955

2,709,096

RESILIENT BUSHING AND METHOD OF MAKING SAME

Edward E. Blaurock, Fort Wayne, Ind., assignor to United States Rubber Company, New York, N. Y., a corporation of New Jersey Application November 29, 1949, Serial No. 130,039

3 Claims. (Cl. 287—85)

This invention relates to a resilient bushing and the method of making it. The invention relates particularly to a bushing having a tubular body of rubber containing uniformly distributed radial compressive stresses initially induced therein between a shell of two concentric cylindrical metal sectors and a concentric metal core, to which metal members the outer and inner arcuated surfaces of the rubber is bonded.

Bushings relating to this invention are useful as oscillatable bearings, resilient connections and supports. After the bushing is installed, the tubular rubber body therein is subjected to external forces by the operating load that set up stresses in the rubber which tend to pull the rubber away from the metal core and the shell, and thereby break the bond between the rubber and the metal parts.

Heretofore, it has been proposed to set up initial compressive stresses in the rubber between the shell and the core so that they will decrease the effectiveness of the stresses which are induced in the rubber by the operating loads on the bushing to break the bond of the rubber to the shell and the core. In accordance with this prior practice the initially induced compressive stresses have not been uniformly distributed in radial directions about the axis of the core. The rubber bond in such prior bushings failed in the areas where the initial radial compressive stresses were less intensive, and the failure of the bond extended to other areas until the entire bushing failed.

It has also been proposed to shrink a unitary metal shell over a cylindrical body of rubber which is vulcanized to the shell for the purpose of inducing uniformly distributed radially directed compressive stresses in the rubber between the shell and a core. Such practice has the objection of requiring special dies for shrinking the metal shell, and it also has the objection of injuring the bond between the rubber and the shell as a result of disturbing the surface of the metal shell adjacent to the bond.

In accordance with the present invention the resilient tubular body of rubber is molded and bonded by vulcanization to and between a metal core and two cylindrical metal shell sectors, which are arranged concentric with the axis of the core and with their axial edges separated a sufficient distance to permit the diameter of the outer shell to be reduced by forcing the shells towards each other and bending the opposed axial edges of the shells inwardly so as to maintain the concentric relation between the shell and the core, whereby uniformly distributed compressive radial stresses are induced in the rubber between the shell and the core. The diameter of the metal shell is thus reduced before the bushing is installed and the initially induced uniformly distributed compressive radial stresses produces a rubber bond of uniform and greater effective strength.

This invention will be further described in reference to the accompanying drawings, in which.

Figure 1:
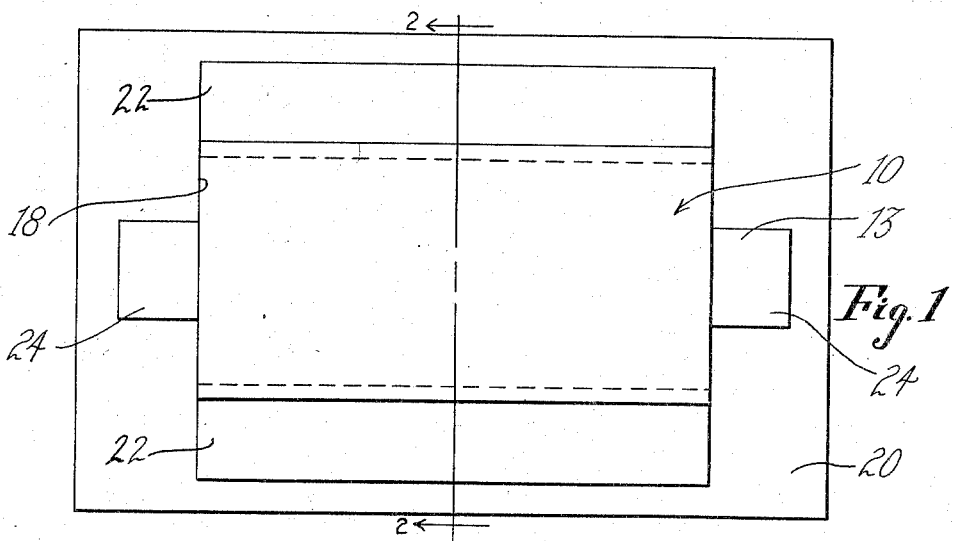
Fig. 1 is a top plan view of the lower half of a mold containing a resilient rubber bushing which may be subsequently subjected to compressive stresses in accordance with this invention, and illustrating the method of manufacture.
Figure 2:
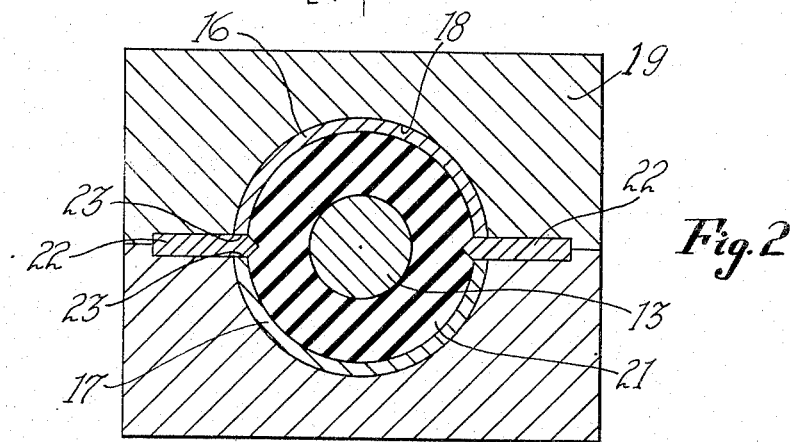
Fig. 2 is a cross-sectional view of both halves of the mold assembled around the vulcanized rubber bushing and taken as indicated by line 2—2 in Fig. 1.
Figure 3:
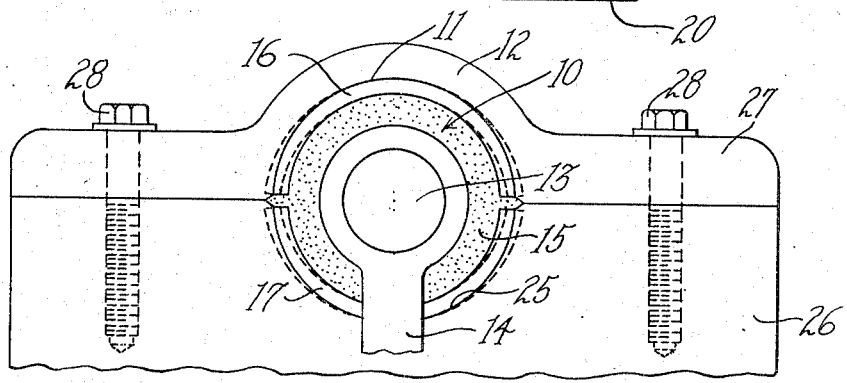
Fig. 3 is an end view of the rubber bushing after it has been installed in its operative position between two relatively oscillatable members and subjected to compressive stresses.

This invention is illustrated in reference to an oscillatable bearing which is molded as shown in Figs. 1 and 2 and may be installed as shown in Fig. 3. The bearing when installed, as in Fig. 3, comprises a cylindrical bushing 10 having an outer cylindrical metal shell 11 affixed to a socket member 12 and an inner cylindrical metal core 13 affixed to a member 14, which is oscillatable in respect to the member 12. A tubular body of resilient deformable rubber 15 is interposed between the shell 11 and the core 13, and is bonded by vulcanization to both metal members. The shell 11 is made of two cylindrical sectors 16 and 17, which are concentric with the axis of the core 13, and retain the rubber under uniformly distributed compressive radial stresses.

Referring to Figs. 1 and 2 the rubber compound, of which the rubber body 15 is made, is molded and vulcanized in a mold cavity 18 formed by the mold halves 19 and 20. The upper mold half 19 has been removed in Fig. 1 to disclose the top view of the molded bushing 10 in the lower half of the cavity 18.

In the operation of molding the bushing, the metal sector 17 of the cylindrical shell is placed in the lower half of the cavity 18. The rubber compound 21 is placed around the core 13, which is then placed in the bottom half of the mold cavity 18. The metal plates 22 are placed in the recessed sides of the lower mold half 20 to fill the space between the axial edges 23 of the bottom sector 17 and top sector 16 which is placed around the upper part of the rubber compound 21. The top mold half 19 is then placed on the bottom half and the assembled mold is placed in a vulcanizing press in which the rubber compound 21 is vulcanized.

The inner surface of the shell sectors 16 and 17 and the outer cylindrical surface of the core 13 are treated in a well-known manner to produce a strong vulcanized bond between the contacting surface of rubber and the metal parts. The shell sectors 16 and 17 are cylindrical after being assembled in the mold, but the arc of each sector is less than 180°. The sectors 16 and 17 are retained in the mold concentric with the axis of the core 13, which is retained in a fixed position by its ends 24 resting snugly in recesses in the ends of the mold halves 19 and 20.

After the vulcanized bushing 10 is removed from the mold, the molded position of the parts are retained, except for the metal sectors 16 and 17 being drawn closer together as the result of the shrinkage of the rubber upon cooling. When the bushing is installed as shown in Fig. 3, the sectors 16 and 17 of the shell are further forced together and made concentric with the axis of the core 13 by bending inwardly the axial edges 23 of the sectors from their dotted line position, as indicated in Fig. 3. Of course the reduction in the diameter of the shell 11 may be obtained by first changing the radius of the arc of the sectors 16 and 17 by bending the edges 23 inwardly and then forcing the sectors together or by doing both actions simultaneously. The first mode of reducing the diameter of the rubber body may be carried out before the bushing is installed for use, and the second mode may be carried out before or during the installation of the bushing for use. All such modes of reducing the diameter of the rubber body to induce uniformly distributed compressive radial stresses in the rubber and maintain the concentricity of the shell and the core are considered equivalents.

The reduction in the diameter of the bushing 10 may be effected by forcing the bushing into a bore 25 in the socket member 12 which is smaller than the molded diameter of the bushing. This is done as illustrated in Fig. 3 by clamping the bushing as molded between the semi-cylindrical bores in the body 26 and the cap 27 of the member 12 with cap screws 28. In that case the diameter of the bushing may be reduced by simultaneously bending the edges 23 of the metal sectors 16 and 17 inwardly and forcing the sectors together, or the reduction in diameter may be made prior to the installation.

While a specific form of bushing and method of making it has been described herein, it will be understood that changes in the details may be made without departing from the spirit of the invention and the scope of the appended claims.

Having thus described my invention, what I claim and desire to protect by Letters Patent is:

1. Method of making a resilient bushing comprising the steps of bonding the outer cylindrical surface of a tubular body of rubber to the inner surface of two cylindrical metal sectors and bonding the inner cylindrical surface of said tubular body to an inner core while all of said members are arranged concentrically with respect to the axis of said core and while the opposed axial edges of said sectors are spaced apart, and inducing initial radial compressive stresses in the cylindrical body of rubber by reducing the diameter of said cylindrical sectors equally on all radii.

2. Method of making a resilient bushing comprising the steps of molding a tubular body of rubber around a metal core of circular transverse cross-section and within a shell of two cylindrical metal sectors and bonding the inner and outer cylindrical surfaces of said rubber to the outer and inner surfaces of said core and shell respectively by vulcanizing said rubber to the metal parts while they are concentric with respect to each other and while the axial edges of said sectors are separated, inducing uniformly distributed initial radial compressive stresses in the body of rubber after vulcanization by forcing the metal sectors closer together and bending their axial edges inwardly to bring the sectors in concentricity to the axis of said core.

3. A resilient bushing in combination with a socket therefor for retaining said bushing under radial compression, said bushing comprising an inner elongated metal core of circular cross-section, a divided outer metal shell formed of at least two concentric cylindrical sectors substantially free from circumferential shrinkage strains, a tubular body of rubber having its outer and inner surfaces respectively secured with an undisturbed original bond to said shell and core, said shell and body of rubber being concentric with said core, and said rubber having uniformly distributed compressive radial stresses maintained therein on all radii by radial pressure exerted on said shell by said socket.

References Cited in the file of this patent

UNITED STATES PATENTS

| | | |
|---|---|---|
| 2,251,416 | Parker | Aug. 5, 1941 |
| 2,362,008 | Hile | Nov. 7, 1944 |
| 2,367,861 | Goldschmidt et al. | Jan. 23, 1945 |
| 2,562,381 | Goldsmith | July 31, 1951 |